(12) United States Patent
Weide et al.

(10) Patent No.: US 11,115,282 B2
(45) Date of Patent: Sep. 7, 2021

(54) APPARATUS AND MEASUREMENT METHOD FOR IDENTIFYING NETWORK DEVICES

(71) Applicant: Rohde & Schwarz GmbH & Co. KG, Munich (DE)

(72) Inventors: Jörg Weide, Leipzig (DE); Jens Geier, Leipzig (DE); Daniel Schmidt, Altenburg (DE); Sebastian Spieß, Leipzig (DE); Bernd Buschinski, Leipzig (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 50 days.

(21) Appl. No.: 16/219,459

(22) Filed: Dec. 13, 2018

(65) Prior Publication Data

US 2019/0190781 A1 Jun. 20, 2019

(30) Foreign Application Priority Data

Dec. 15, 2017 (DE) .................. 102017222916.0

(51) Int. Cl.
*H04L 12/24* (2006.01)
*H04L 12/26* (2006.01)
*H04L 29/08* (2006.01)

(52) U.S. Cl.
CPC ...... *H04L 41/0869* (2013.01); *H04L 41/0806* (2013.01); *H04L 41/0853* (2013.01); *H04L 41/12* (2013.01); *H04L 41/142* (2013.01); *H04L 43/028* (2013.01); *H04L 67/146* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 9,444,839 B1* | 9/2016 | Faulkner | H04L 63/1466 |
| 9,608,904 B2* | 3/2017 | Loach | H04L 45/74 |
| 10,506,440 B2* | 12/2019 | Erman | H04W 88/04 |
| 2013/0155899 A1* | 6/2013 | Gallagher | H04L 63/06 370/254 |

(Continued)

FOREIGN PATENT DOCUMENTS

EP 2887609 A1 6/2015

OTHER PUBLICATIONS

Kohno et al. "Remote physical device fingerprinting", published in IEEE Transactions on Dependable and Secure Computing, May 2005, vol. 2, No. 2, pp. 93-108, 15 pages.

*Primary Examiner* — Scott B Christensen
(74) *Attorney, Agent, or Firm* — Ditthavong, Steiner & Mlotkowski

(57) ABSTRACT

An apparatus for identifying network devices comprises a data acquisition unit that receives data from a multiplicity of network devices. It also comprises an interpretation unit that extracts identification data from the data and determines which of the multiplicity of network devices has sent the received data. A similarity of measured data of a physical clock to a predefined pattern and/or to previously measured data of the physical clock is analysed as a first criterion of an association of received data. In addition, at least one further criterion of an association of received data can be analysed among the identification data.

13 Claims, 5 Drawing Sheets

(56) References Cited

U.S. PATENT DOCUMENTS

2014/0237595 A1\* 8/2014 Sridhara ................ G06F 21/55
                                                         726/23
2015/0180774 A1    6/2015 Loach \* cited by examiner

APPARATUS AND MEASUREMENT METHOD FOR IDENTIFYING NETWORK DEVICES

TECHNICAL FIELD

The invention relates to an apparatus and a measurement method for identifying network devices in a communications network.

BACKGROUND ART

A plurality of mobile devices can use a shared network connection by employing tethering. This is sub-optimum for the network operator. To be able to prevent this, however, the network operator must be able to detect such tethering.

In addition, for official duties it is sometimes necessary to monitor data connections to network devices. The legal framework, however, allows only targeted monitoring of individual data streams to specific network devices. Blanket monitoring is not permitted. For this purpose, it is necessary to identify reliably data streams emanating from individual network devices.

In order to address the two aforementioned problems, document U.S. Pat. No. 9,608,904 B2 discloses a method for identifying network devices. This document mentions a multiplicity of different criteria that can be used to identify different network devices. The disadvantage with the method disclosed in this document, however, is that frequent incorrect detections arise as a result of the numerous data sources.

In addition, the document "Remote physical device fingerprinting", Tadayoshi Kohno, Andre Broido, K. C. Claffy, IEEE Transactions on Dependable and Secure Computing, Vol. 2, no. 2, pp. 93-108, May 2005, discloses using a clock skew as a criterion for identifying network devices. Using solely this method is disadvantageous because it does not reliably allow identification.

Thus, there is a need to provide an apparatus, and a measurement method for reliable identification of network devices in a communications network.

SUMMARY OF THE INVENTION

According to a first aspect of the invention, an apparatus according to the invention for identifying network devices in a communications network comprises a data acquisition unit that is designed to receive data from a multiplicity of network devices in the communications network. In addition, the apparatus comprises an interpretation unit that is designed to extract identification data from the data and to use said identification data to determine which of the multiplicity of network devices has sent the received data. The interpretation unit is designed here in particular to analyse as a first criterion of an association of received data with a specific network device, a similarity of measured data of a physical clock of the network devices to a predefined pattern and/or to previously measured data of the physical clock of the network devices.

In addition, the interpretation unit can preferably be designed to analyse at least one further criterion of an association of received data with a specific network device among the identification data. This achieves that individual network devices within the communications network can be identified with a minimum probability of incorrect detections.

The interpretation unit is advantageously and preferably designed to determine for each network device identified on the basis of the criteria a confidence value for each criterion. This allows a user of the apparatus to review how probable is the detection of the network devices.

The interpretation unit is also advantageously and preferably designed to determine the confidence value for each of the criteria by ascertaining a similarity or a match of the analysed criterion to an ideal value of the analysed criterion in question. This allows the confidence value to be ascertained particularly accurately.

The apparatus also advantageously and preferably comprises a display device. The identified network devices and, for each identified network device, the confidence value for each analysed criterion, are displayed on the display device. A user of the apparatus can thereby see at a glance which different network devices have been identified and how great is the probability that this identification is correct.

The interpretation unit is advantageously and preferably also designed to determine for each identified network device an overall confidence value from the confidence values all the analysed criteria. It is thereby made even easier for the user of the apparatus to recognize whether or not the identification of a network device is reliable.

The interpretation unit is advantageously and preferably also designed to determine the overall confidence value by forming the arithmetic mean, by forming the median, by forming the geometric mean, by forming the harmonic mean, by forming the quadratic mean or by forming the cubic mean from the confidence values of the individual criteria. This ensures that the overall confidence value is determined particularly accurately.

In another advantageous and preferred embodiment, the apparatus has a display device that displays the identified network devices and also the confidence values and/or the overall confidence value. This makes it particularly easy for the user to recognise which network devices have been identified with what probability.

The interpretation unit is also advantageously and preferably designed to detect an association of received data with a specific, already identified network device when all the analysed criteria exhibit a similarity above a predefined similarity threshold value or exhibit a match. Alternatively, this can already be detected when a majority of all the analysed criteria exhibit a similarity above a predefined similarity threshold value or exhibit a match. As another alternative, this can be detected already when at least a predefined number of analysed criteria exhibit a similarity above a predefined similarity threshold value or exhibit a match. The thresholds at which detection of an already known network device is made can thereby be set very precisely.

In another advantageous and preferred embodiment, the interpretation unit can also be designed to identify a new network device when all the analysed criteria exhibit a similarity below the predefined similarity threshold value or do not exhibit a match with any of the already identified network devices. Alternatively, this can already be detected when a majority of all the analysed criteria do not exhibit a similarity above a predefined similarity threshold value or do not exhibit a match. As another alternative, a new network device can be detected when at most a predefined number of analysed criteria exhibit a similarity above a predefined similarity threshold value or exhibit a match. The conditions under which a new network device is identified can hence also be set very precisely.

According to another advantageous and preferred embodiment, the interpretation unit is also preferably designed to analyse as the at least one further criterion a similarity of IP fragment identifiers, and/or a similarity of TCP timestamps, and/or a match of IMSI numbers, and/or a match of IMEI numbers, and/or a match of ISDN numbers, and/or a match of mobile device identifiers in HTTP traffic, and/or a similarity of advertising identifiers, and/or a match of tracking cookies in HTTP traffic, and/or a similarity of DNS profiles, and/or a similarity of user agent patterns, and/or activity phases and inactivity phases within the data from network devices. It is thus possible to draw on numerous different data sources in order to identify network devices. This achieves a particularly high probability of the correct identification.

The interpretation unit is advantageously and preferably designed to analyse at least two further criteria, preferably at least three further criteria, more preferably at least four further criteria among the identification data. This can further increase the probability of a correct identification.

The network devices to be identified are advantageously and preferably multi-stack network devices. Alternatively, the network devices to be identified are arranged within the communications network behind a Network Address Translation (NAT) router from the viewpoint of the apparatus. It is hence possible to identify even these network devices, which are particularly difficult to identify.

The network devices advantageously and preferably use different network addresses at different times. Even these difficult-to-identify network devices can be identified by the apparatus according to the invention.

The identified network devices preferably run programs. The programs each produce program data as part of the data sent by the network device. The interpretation unit is then designed to use activity phases and inactivity phases within the data from a network device to distinguish between program data from different programs of the network device. It is thereby possible to infer a user behaviour of a user of the network device.

The interpretation unit is preferably designed in this case to identify the programs of the network devices on the basis of the program data. It is hence possible to draw particularly accurate conclusions about the user behaviour.

A measurement method according to a second aspect of the invention is used to identify network devices in a communications network. The method comprises the following steps: receiving data from a multiplicity of network devices in a communications network; extracting identification data from the data; and using said identification data to determine which of the multiplicity of network devices has sent the received data. In this process, a similarity of measured data of a physical clock of the network devices to a predefined pattern and/or to previously measured data of the physical clock of the network devices is analysed as a first criterion of an association of received data with a specific network device.

Preferably at least one further criterion of an association of received data with a specific network device is analysed among the identification data. This achieves that individual network devices within the communications network can be identified with a minimum probability of incorrect detections.

BRIEF DESCRIPTION OF THE DRAWINGS

Exemplary embodiments of the invention are described below by way of example only, but not for limitation with reference to the drawing, which shows an advantageous exemplary embodiment of the invention, and in which.

DETAILED DESCRIPTION OF THE PREFERRED EMBODIMENTS

The design and operation of various exemplary embodiments of the apparatus according to the invention, in this case in the form of a measurement apparatus 1, are explained with reference to FIG. 1 to FIG. 5. Lastly, the function of an exemplary embodiment of the measurement method according to the invention is illustrated with reference to FIG. 6. In some cases, identical elements have not been shown and described again in similar illustrations.

Figure 1:
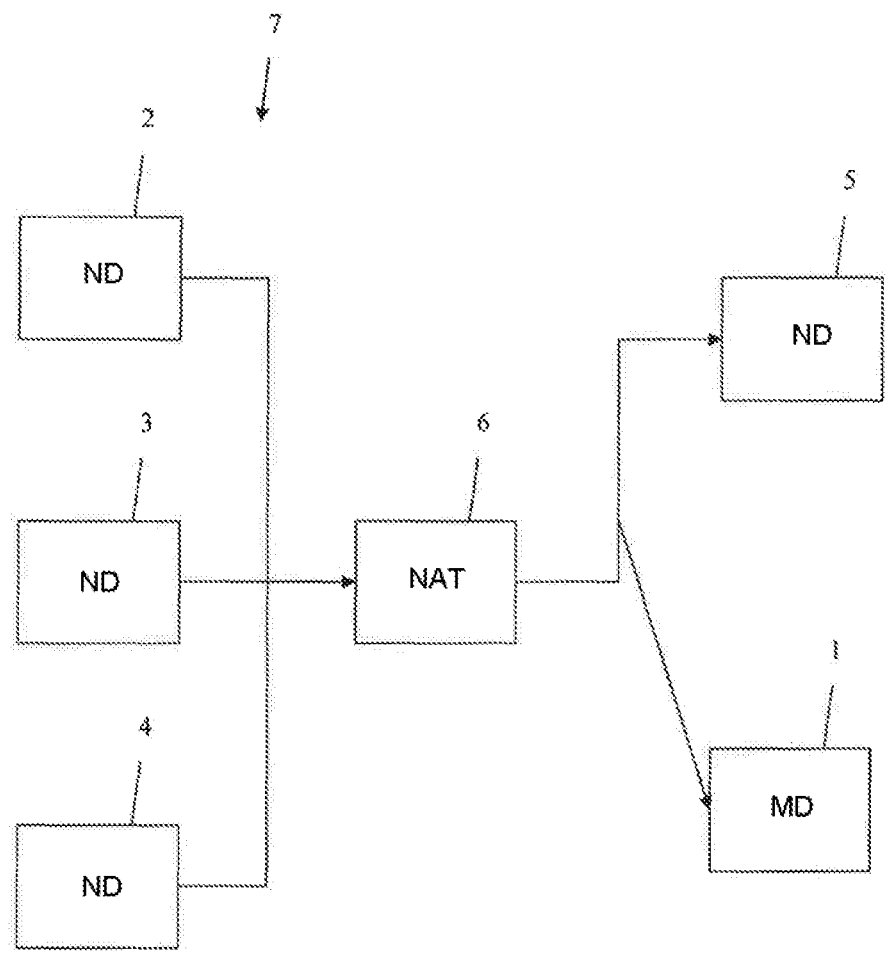
FIG. 1 is a block diagram of a first exemplary embodiment of the apparatus according to the invention.

FIG. 1 shows a first exemplary embodiment of the measurement apparatus 1 according to the invention. The measurement apparatus 1 is coupled to a data connection in a communications network 7. The communications network 7 comprises a plurality of network devices 2, 3, 4, 5. In this embodiment, the network devices 2, 3, 4 are connected to a Network Address Translation (NAT) router 6. Also connected to the router 6 is the network device 5. The measurement apparatus 1 is coupled to a communications connection between the router 6 and the network device 5. In the example shown here, one of the network devices 2, 3, 4 is meant to be identified while it is sending data that is being routed to the network device 5 by the router 6.

For this purpose, the measurement apparatus 1 performs monitoring of the data sent by the network devices 2, 3, 4 to the network device 5. In particular, the data is searched for identification data. The identification data is then analysed. It is determined on the basis of the identification data, which of the network devices 2, 3, 4 has sent the corresponding data. Details of this analysis are provided with reference to the subsequent FIG. 2.

Figure 2:
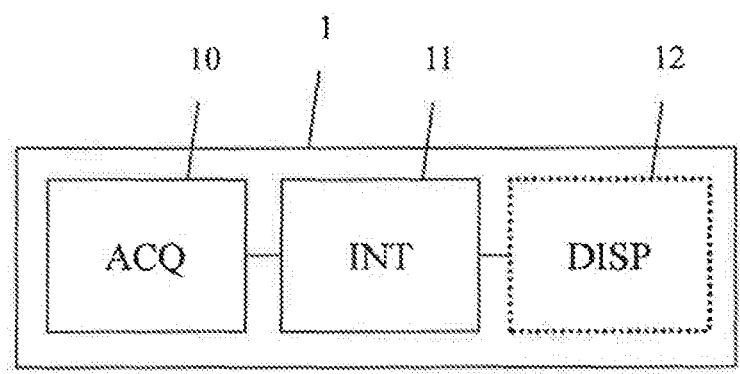
FIG. 2 is a detailed view of the first exemplary embodiment of the apparatus according to the invention.

FIG. 2 shows a detailed view of the measurement apparatus 1 from FIG. 1. The measurement apparatus 1 comprises an acquisition unit 10, which is connected to an interpretation unit 11. The interpretation unit 11 is in turn connected to a display device 12, said display device constituting an optional component.

The acquisition unit 10 receives data from the network devices 2, 3, 4 within the communications network 7. This data is passed from the acquisition unit to the interpretation unit 11. The interpretation unit 11 extracts identification data from the received data. The interpretation unit 11 uses this identification data to identify the different network devices 2, 3, 4.

In particular in this process, the interpretation unit uses as a first criterion of an association of received data with a specific network device, a similarity of measured data of a physical clock of the network devices 2, 3, 4 to a predefined pattern and/or to previously measured data of the physical clock of the network devices 2, 3, 4. In order to increase the accuracy of the analysis, the interpretation unit preferably uses here at least one further criterion of an association of received data with a specific network device among the identification data.

It is possible to use here as the further criteria a similarity of IP fragment identifiers, and/or a similarity of TCP timestamps, and/or a match of IMSI numbers, and/or a match of IMEI numbers, and/or a match of ISDN numbers, and/or a match of mobile device identifiers in HTTP traffic, and/or a similarity of advertising identifiers, and/or a match of tracking cookies in HTTP traffic, and/or a similarity of DNS profiles, and/or a similarity of user agent patterns. It is also possible to use activity phases and inactivity phases in the data transmission, as illustrated with reference to FIG. 3-5. The interpretation unit can here analyse two, three, four, five or any number of further criteria of this type.

A match of specific data to a specific network device 2, 3, 4 is established by the interpretation unit when a defined number of analysed criteria exhibit a similarity above a predefined similarity threshold value or exhibit a match. This predetermined number may be the majority of all the analysed criteria or even the totality of all the analysed criteria. Thus this process involves a comparison between pre-measured criteria of the individual network devices and the currently measured criteria.

If the currently measured criteria differ from the previously measured criteria, then a new network device is identified. This is the case when a certain number of analysed criteria do not exhibit a similarity or a match with previously measured criteria. This defined number may be the total number of criteria, the majority of the criteria or even a defined minority of the criteria.

In particular, the measurement apparatus is able even network devices that are multi-stack network devices or that are located behind the NAT router from the viewpoint of the measurement apparatus are identified. It is also possible using the measurement apparatus to identify network devices that use different network addresses at different times.

The apparatus, in particular the interpretation unit 11, additionally determines a confidence value for each individual analysed criterion. This value equals the probability associated with the corresponding network device having been identified correctly. Besides the identified network devices 2, 3, 4, the corresponding confidence values of the individual criteria can additionally be displayed on the optional display device 12. In addition, the interpretation unit 11 can determine from the individual confidence values of the criteria for each identified network device 2, 3, 4 an overall confidence value, and optionally display this value likewise on the display device 12. Various averaging techniques can be used to determine the overall confidence value. In particular, an arithmetic mean, a median, a geometric mean, a harmonic mean, a quadratic mean or a cubic mean can be used for this purpose.

Figure 3:
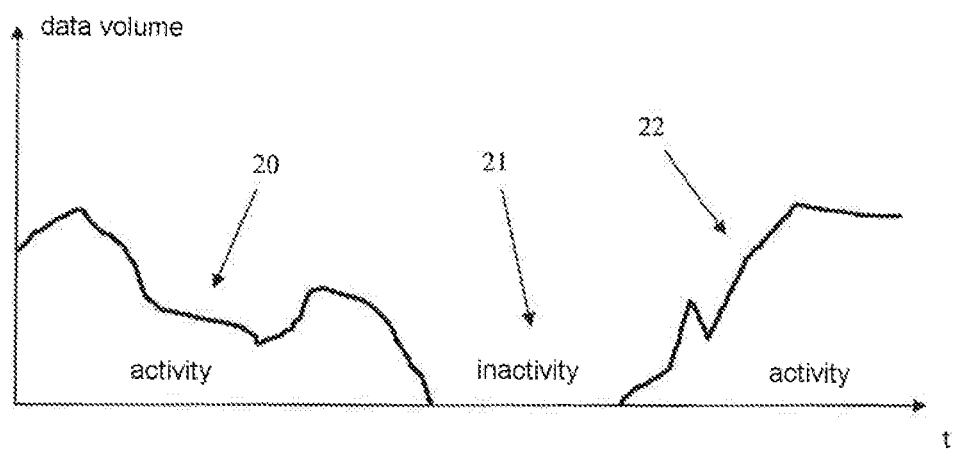
FIG. 3 is a first graph of an identification option of a second exemplary embodiment of the apparatus according to the invention.

FIG. 3 shows the volume of data transmitted by a network device over time. The figure shows activity phases 20, 22 separated by an inactivity phase 21. In this diagram, there is no transmitted data whatsoever plotted during the inactivity phase. This is merely the ideal case, however. In reality, even when not being actively operated by a user, programs or applications of the network devices transmit status data, resulting in a continuous low level of data traffic. Such over-the-top data can be detected by using a threshold value. This over-the-top data is then not used to determine activity phases and inactivity phases. In other words, while only over-the-top data is detected below a threshold value, this is considered to be an inactivity phase.

Figure 4:
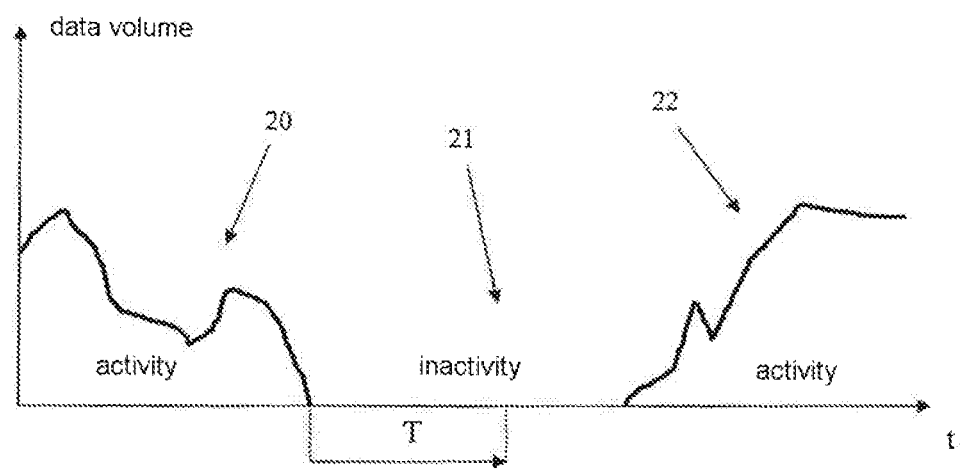
FIG. 4 is a second graph of the identification option of the second exemplary embodiment of the apparatus according to the invention.
Figure 5:
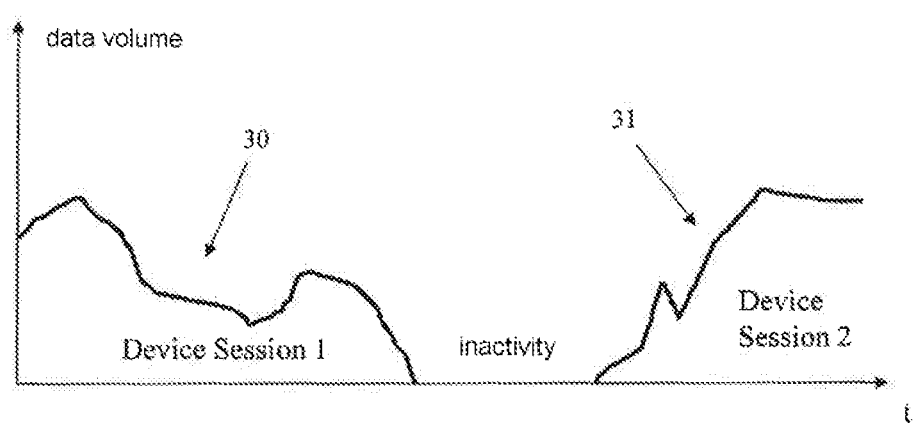
FIG. 5 is a third graph of the identification option of the second exemplary embodiment of the apparatus according to the invention.

FIG. 4 also shows a time threshold value T. This time threshold value is used to identify an inactivity phase 21. Since no further data transmission, or more precisely no further data transmission above the aforementioned threshold value, has occurred in the past activity phase 20 during a time period T, the time period from the last data transmission in the activity phase 20 until the start of the next data transmission in the activity phase 22 is deemed to be the inactivity phase 21.

Although in the case previously described, only activity phases and inactivity phases within the data transmission of a single network device are analysed, it is equally possible to analyse the entire data traffic in the same manner. Conclusions about the data-transmitting network devices can be made similarly on the basis of patterns in the activity phases and inactivity phases.

FIG. 5 again shows the data volume over time. This figure again shows only the data from one network device. The diagram corresponds to the diagram of FIG. 3. A first device session 30 is associated with the first activity phase 20. A second device session 31 is associated with the second activity phase 22. The device sessions 30, 31 originate from the same network device, as was ascertained previously. They can originate from an identical program or different programs of this one network device. More detailed identification is possible, for example, using deep packet inspection (DPI), in which the data in the individual packets is analysed more closely.

It is hence possible to analyse user behaviour on the basis of the information about the programs used. In particular, it is possible to determine the form of use currently being made by the user of the network device.

Figure 6:
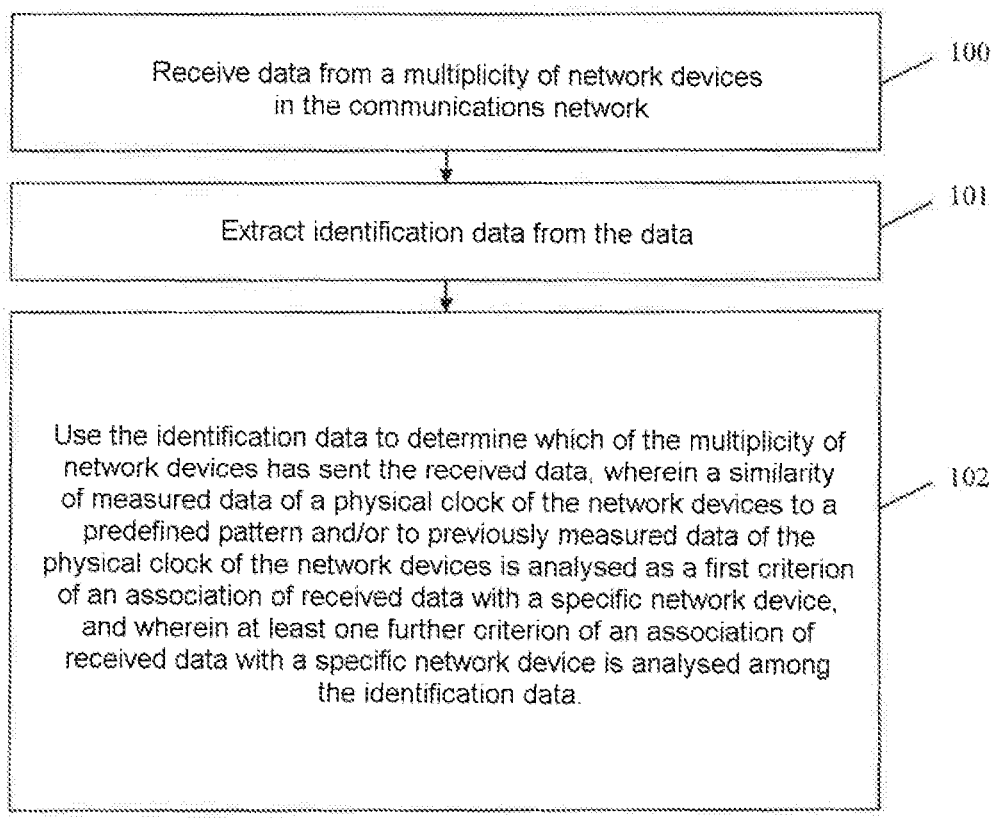
FIG. 6 is a flow diagram of an exemplary embodiment of the measurement method according to the invention.

Finally, FIG. 6 shows a flow diagram of an exemplary embodiment of the measurement method according to the invention. In a first step 100, data is received from a multiplicity of network devices in the communications network. In a second step 101, identification data is extracted from the data. In a third and final step 102, the identification data is used to determine which of the multiplicity of network devices has sent the received data. In this step, a similarity of measured data of a physical clock of the network devices to a predefined pattern and/or to previously measured data of the physical clock of the network devices is analysed as a first criterion of an association of received data with a specific network device. In addition, a second criterion is preferably analysed.

The invention is not limited to the presented exemplary embodiment. The network devices may be mobile terminal devices such as mobile phones, but may also be computers such as PCs or the like. All the features described above or shown in the figures can advantageously be combined with one another in any way without departing from the invention. Within this application "designed to" can also mean "configured to" or "having the functionality to".

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An apparatus for identifying network devices in a communications network without using explicit identification information of the network devices, the apparatus comprising:
   a processor; and
   memory comprising software, which when executed by the processor, implements:
      a data acquirer configured to receive data from a plurality of network devices in the communications network; and
      an interpreter configured to:
         extract identification data from the data, the identification including information from which the identity of the network devices may be inferred;
         analyse the extracted identification data by:
            analysing as a first criterion of a group of criteria an association of the identification data with one or more specific network devices to identify at least one of a similarity of measured data of a physical clock of the network devices to a predefined pattern and/or to previously measured data of the physical clock of the network devices, and
            analysing one or more further criterion of the group of criteria to identify additional associations of the identification data with the one or more specific network devices based on traffic information;
         determine, based on the results of the analyzing of the first criterion and the one or more further criterion, which of the plurality of network devices has sent the received data;
         evaluating the results of the analysing to provide feedback to a user by:
         determining, for each network device identified on the basis of the criteria, a separate confidence value for each criterion,
         determining for each identified network device an overall confidence value from the confidence values of all the analysed criteria, and
         determining the overall confidence value by forming an arithmetic mean, by forming a median, by forming a geometric mean, by forming a harmonic mean, by forming a quadratic mean, or by forming a cubic mean from the confidence values of the individual criteria; and
         providing the overall confidence value to the user.

2. The apparatus according to claim 1, wherein the interpreter is configured to determine the separate confidence value for each of the criteria by ascertaining a similarity or a match of the analysed criterion to an ideal value of the analysed criterion in question.

3. The apparatus according to claim 1, wherein the apparatus also comprises a display device, wherein the display device is configured to display the identified network devices, and wherein the display device is configured to display the overall confidence value.

4. The apparatus according to claim 1, wherein the apparatus comprises a display device, wherein the display device is configured to display the identified network devices, and wherein the display device is configured to display for each identified network device separate confidence value for each criterion or the overall confidence value for each analysed criterion.

5. The apparatus according to claim 1, wherein the interpreter is configured to detect an association of received data with a specific, already identified network device:
   when all the analysed criteria exhibit a similarity above a predefined similarity threshold value or exhibit a match, or
   when a majority of all the analysed criteria exhibit a similarity above a predefined similarity threshold value or exhibit a match, or
   when at least a predefined number of analysed criteria exhibit a similarity above a predefined similarity threshold value or exhibit a match.

6. The apparatus according to claim 5, wherein the interpreter is configured to identify a new network device
   when all the analysed criteria exhibit a similarity below a predefined similarity threshold value or do not exhibit a match with any of the already identified network devices,
   when a majority of all the analysed criteria do not exhibit a similarity above a predefined similarity threshold value or do not exhibit a match, or
   when a predefined number of analysed criteria exhibit a similarity above a predefined similarity threshold value or exhibit a match.

7. The apparatus according to claim 1, wherein the interpreter is configured to analyse one or more additional criterion selected from:
   a similarity of IP fragment identifiers,
   a similarity of TCP timestamps,
   a match of IMSI numbers,
   a match of IMEI numbers,
   a match of ISDN numbers,
   a match of mobile device identifiers in HTTP traffic,
   a similarity of advertising identifiers,
   a match of tracking cookies in HTTP traffic,
   a similarity of DNS profiles,
   a similarity of user agent patterns, or
   activity phases and inactivity phases within the data from network devices.

8. The apparatus according to claim 1, wherein the interpreter is configured to analyse at least two additional criteria among the identification data.

9. The apparatus according to claim 1, wherein each network device identified comprises multi-stack network devices, or
   wherein each network device identified is arranged within the communications network behind at least one NAT router from the viewpoint of the apparatus.

10. The apparatus according to claim 1, wherein the plurality of network devices use different network addresses at different times.

11. The apparatus according to claim 2, wherein each network device identified runs programs, wherein the programs each produce program data as part of the data sent by the network device, and wherein the interpreter is configured to use activity phases and inactivity phases within the data from a network device to distinguish between program data from different programs of the network device.

12. The apparatus according to claim 11, wherein the interpreter is configured to identify the programs of the network devices on the basis of the program data.

13. A measurement method for identifying network devices in a communications network without using explicit identification information of the network devices, the method comprising:

receiving data from a plurality of network devices in the communications network; and extracting identification data from the data, the identification including information from which the identity of the network devices may be inferred;

analysing the extracted identification data by:

analysing as a first criterion of a group of criteria an association of the identification data with one or more specific network devices to identify at least one of a similarity of measured data of a physical clock of the network devices to a predefined pattern and/or to previously measured data of the physical clock of the network devices, and analysing one or more further criterion of the group of criteria to identify additional associations of the identification data with the one or more specific network devices based on traffic information;

determining, based on the results of the analyzing of the first criterion and the one or more further criterion, which of the plurality of network devices has sent the received data;

evaluating the results of the analysing to provide feedback to a user by:

determining, for each network device identified on the basis of the criteria, a separate confidence value for each criterion, determining for each identified network device an overall confidence value from the confidence values of all the analysed criteria, and determining the overall confidence value by forming an arithmetic mean, by forming a median, by forming a geometric mean, by forming a harmonic mean, by forming a quadratic mean, or by forming a cubic mean from the confidence values of the individual criteria; and providing the overall confidence value to the user.

* * * * *